L. DRAPER.
Curry-Combs.
No. 151,764. Patented June 9, 1874.
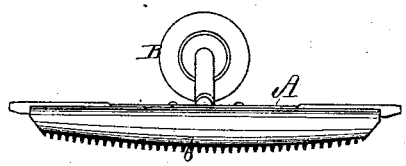
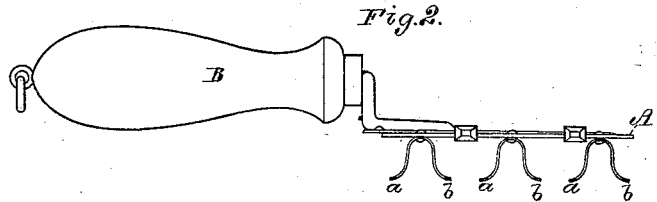
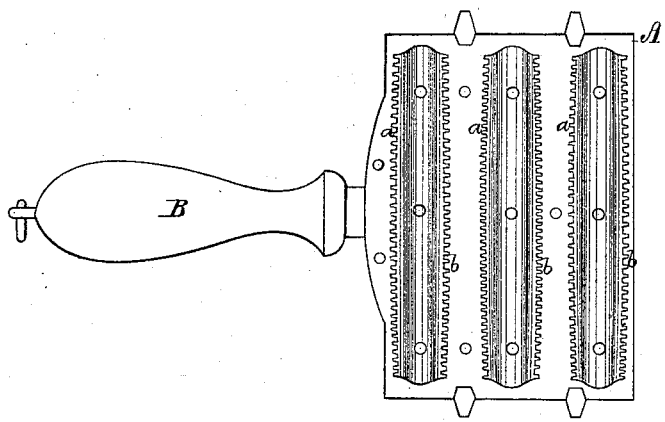
Witnesses.
Lafayette Draper.
by his attorney.

UNITED STATES PATENT OFFICE.

LAFAYETTE DRAPER, OF NORTH ATTLEBOROUGH, MASSACHUSETTS.

IMPROVEMENT IN CURRY-COMBS.

Specification forming part of Letters Patent No. 151,764, dated June 9, 1874; application filed March 25, 1874.

*To all whom it may concern:*

Be it known that I, LAFAYETTE DRAPER, of North Attleborough, of the county of Bristol and State of Massachusetts, have invented a new and useful Improvement in Curry-Combs; and do hereby declare the same to be fully described in the following specification and represented in the accompanying drawings, of which—

Figure 1 is a bottom view, Fig. 2 a side view, and Fig. 3 a front-end view, of a curry-comb containing my improvement.

In curry-combs as heretofore made the jaws are serrated or dentated plates arranged parallel to each other, and at right angles, thereabout, with the base-plate of the comb, each two next adjacent jaws being at an equal distance apart throughout their extension beyond the base-plate.

In carrying out my improvement I arrange each two next adjacent dentated jaws or the rows of teeth so as to incline in opposite directions, in a manner to cause each of the teeth to be nearly parallel with, or make an angle of about twenty degrees with, the base-plate, the inclination being either in a curve or in straight line.

In the drawings, the base-plate is shown at A, the handle at B, and the rows of jaws at *a b a b*, each jaw being dentated in the usual manner. The jaws *a a a*, or the teeth thereof, or both jaws and teeth, incline in one direction to the base-plate, while the jaws *b b b*, or the teeth thereof, or both, incline in the opposite way with respect to such base-plate, each jaw being curved transversely, as shown.

By this arrangement of the dentated jaws one half of the number during each stroke or draft of the comb upon the hair of a horse will be combing or currying it, while the other half of them will be in the act of being freed from the dandruff or hair gathered up by them during the next preceding stroke. In fact, by my improvement, the curry-comb not only, while in use, will curry to excellent advantage, but, in common parlance, will free itself of the matters removed from the hide by it.

Instead of every other row of teeth or jaw being inclined in the same direction to the base-plate, and the remainder of them in the opposite way, one-half or a portion of the rows may incline one way, and the rest in an opposite direction relatively to the base-plate. This latter arrangement, however, does not prevent one important advantage incident to the other, viz., the easier access which the latter affords to the rivets and rivet-holes during the process of securing the jaws to the base-plate.

I claim—

A curry-comb having one or more of its rows of teeth inclined in one way nearly into parallelism with the base-plate, and the others in the opposite direction in such manner with respect to the base-plate, all substantially as specified and represented.

LAFAYETTE DRAPER.

Witnesses:
R. H. EDDY,
S. N. PIPER.